United States Patent [19]

Linck et al.

[11] Patent Number: 4,815,931

[45] Date of Patent: Mar. 28, 1989

[54] OVERHUNG RADIAL-FLOW STEAM TURBINE WHEEL WITH TOOTHED AND BOLTED SHAFT CONNECTION

[75] Inventors: Klaus Linck, Grosskarlbach; Bernd Schmitt, Maxdorf; Joachim Nottrott, Darmstadt, all of Fed. Rep. of Germany

[73] Assignee: Aktiengesellschaft Kuehnle, Kopp & Kausch, Fed. Rep. of Germany

[21] Appl. No.: 856,352

[22] Filed: Apr. 28, 1986

Related U.S. Application Data

[63] Continuation-in-part of Ser. No. 492,000, May 5, 1983, abandoned.

[30] Foreign Application Priority Data

May 11, 1982 [DE] Fed. Rep. of Germany ....... 3217598
Jan. 13, 1983 [DE] Fed. Rep. of Germany ....... 3300864

[51] Int. Cl.$^4$ .................. F03B 13/00; F03D 9/00; F04D 29/70
[52] U.S. Cl. .................. 415/121 A; 415/168; 415/175; 415/186; 415/199.2; 416/244 A
[58] Field of Search ............. 415/106, 121 A, 168, 415/186, 188, 199.1, 199.2, 199.6, 202, 169 R, 175; 416/203, 244 A; 417/406, 407; 403/59, 380, 359

[56] References Cited

U.S. PATENT DOCUMENTS

| | | | |
|---|---|---|---|
| 3,746,462 | 7/1973 | Fukuda | 415/121 A X |
| 4,314,705 | 2/1982 | Shimizu | 415/175 X |
| 4,477,223 | 10/1984 | Giroux | 415/169 R |
| 4,606,652 | 8/1986 | Swearingen | 415/168 X |

FOREIGN PATENT DOCUMENTS

| | | | |
|---|---|---|---|
| 1551190 | 1/1970 | Fed. Rep. of Germany . | |
| 3005058 | 8/1980 | Fed. Rep. of Germany . | |
| 67910 | 4/1983 | Japan | 415/168 |
| 725311 | 3/1955 | United Kingdom | 415/168 |

OTHER PUBLICATIONS

Franke, Hermann, ed. *Lueger Lexicon Der Technik*, Deutsche Verlags: Stuttgart, Germany, p. 652 of Band 12: Fahrzeugtechnik.
"Radial Steam Turbine Converts Lost BTUs into Electric Power," in *Power*, vol. 127, No. 7, pp. 105–106, Jul. 1983.
"Einstufige Dampfturbinen," product brochure, Hersteller Von Industriedampfturbinen.

*Primary Examiner*—Robert E. Garrett
*Assistant Examiner*—George Kapsalas
*Attorney, Agent, or Firm*—Foley & Lardner, Schwartz, Jeffery, Schwaab, Mack, Blumenthal & Evans

[57] ABSTRACT

The present invention includes an overhung turbine wheel which is provided with at least one ring of turbine blades and is connected with a shaft. In order to control the thermodynamically required circumferential speeds necessary to achieve maximum efficiency, the turbine wheel is designed as a closed disk which is narrow in the axial direction. The turbine wheel is integral with the turbine blades and furthermore is connected to the shaft through planar connecting surfaces having interfitting teeth. The turbine wheel has a relatively low mass, and the interfitting teeth allow a simple and optimal centering connection. Radial-flow turbines of this kind are standardized in model series, the turbine wheels and shafts in each case being provided with similar interfitting teeth to allow mutual combinations as desired.

14 Claims, 11 Drawing Sheets

OVERHUNG RADIAL-FLOW STEAM TURBINE WHEEL WITH TOOTHED AND BOLTED SHAFT CONNECTION

This application is a continuation-in-part of application Ser. No. 492,000 filed May 5, 1983 and now abandoned.

BACKGROUND OF THE INVENTION

1. Field of the Invention

The present invention relates to a radial-flow turbine with an overhung turbine wheel acted upon by a working fluid flowing in the radially inward direction. The turbine wheel includes at least one ring of turbine blades and is connected to a shaft.

2. Description of the Prior Art

A radial-flow turbine with two rings of turbine blades is described in the German Pat. No. 1 144 738. This known radial-flow turbine operates with a high circumferential efficiency for a given steam flow rate, i.e., for a given temperature gradient. This circumferential efficiency nearly corresponds to a single-stage turbine, however, the circumferential speed of operation cannot be significantly less. The turbine blades are always manufactured separately and are mounted in a suitable manner with each blade base received in and joined with the turbine wheel. For reasons of strength, the blade bases and the junction elements must be adequately large, the result being a correspondingly substantial axial length. Consequently, at high speeds of revolution of the turbine wheel, correspondingly large inertial forces arise. In the past, in radial-flow turbines of this design manufactured by the Applicant, it was necessary that the turbine wheels be supported at both shaft ends—this also being the case for the German Pat. No. 1 144 738. These known radial-flow turbines could be used only in exceptional cases, most of all because the elaborate design resulted in high manufacturing costs. Due to the substantial mass of the turbine-wheel, the thermodynamically required circumferential speeds could be controlled in practice only at very high cost.

Moreover, a two-ring radial-flow turbine is described in the German Offenlegungsschrift No. 1 551 190 wherein the turbine wheel is provided with a central bore for the unilaterally supported shaft. The diameter of the central bore and that of the shaft are designed according to required strength computations. Depending on the design angular speed, the size of the turbine, and other design criteria, an optimal diameter is calculated for each individual turbine. Accordingly, the connection between the shaft and the turbine wheel is not suited for standardized radial-flow turbines. Furthermore, plasticization due to stress-focusing may take place in the area of the central bore.

Also, integral turbine wheels for exhaust driven turbochargers are known, which are connected to the shaft by butt-welding. These are described, for example, in the periodical MTZ, 16th year, No. 11, November 1955, page 323, as comprising a turbine wheel in which the blades are moved up as far as the axial exhaust area. The actual centrifugal forces acting on the turbine blades therefore produce practically no bending moments at the transition between the turbine wheel and the turbine blades. This is in contrast to the previously described radial-flow turbines wherein the turbine blades are mounted to at least approximately radial surfaces of the turbine wheel, and the bending loads generated by the centrifugal forces must be absorbed by making the turbine wheel correspondingly thick and wide.

More recent experimentation has shown furthermore that more than trivial damage, mostly in the area of the rings of blades, is incurred due to impurities in the steam fed to the turbine. This condition was found in particular to apply to those steam supply networks which are shut off at specific times, for instance on weekends. While such a condition can be remedied by resorting to impurity separators, filter or the like, such solution demand high capital investment, and also entail flow losses. Accordingly, the intrinsically high economy of the radial-flow turbine of the above discussed typed is rendered problematical, and it would be difficult to expand the fields of their use beyond those already known.

SUMMARY OF THE INVENTION

One object of the present invention is to provide a radial-flow turbine which can be manufactured at low cost, yet will reliably provide maximum efficiency at high circumferential speeds.

Another object of the present invention is to provide a radial-flow turbine wherein the thermodynamically required circumferential speeds can be controllable with the required reliability.

A further object of the present invention is to provide a radial-flow turbine wherein the turbine wheels and shafts can be manufactured in prefabricated and model-serialized modules whereby the radial-flow turbine can be assembled in simple and modular manner from the various prefabricated components.

Another object of the present invention is to provide a radial-flow turbine wherein damage due to impurity particles entrained in the flow medium will be extensively prevented so that reliable operation shall be assured.

In accordance with the above and other objects the present invention includes a turbine wheel designed as a closed disk which is narrow in the axial direction. The turbine wheel is integral with the turbine blades, and is connected by a planar toothed surface to a shaft. Due to the integral design of turbine wheel and turbine blades, the mass of the rotating parts is significantly reduced, whereby, unexpectedly, an especially economical construction results, Also, a significant reduction in mass is obtained by the closed design of the turbine wheel, which is a narrow in the axial direction and has an approximately rectangular cross-section. The turbine wheel is formed without a central bore for assembly to the shaft but rather is connected to the shaft by a planar toothed surface. However, a small bore can be formed through the turbine wheel and shaft in order to permit them to be connected by a central profiled tension bolt. As a result, high turbine wheel strength is achieved on one hand, and on the other hand, in a surprisingly simple manner, the necessary conditions for serialization and standardization are met. Both turbine wheels and shafts can be prefabricated by model categories, provision being made each time for the planar toothed surfaces. Depending on application and requirement, it is then possible to combine turbine wheels and shafts. The toothed surface appropriately is designed as a Hirth type serration, because this ensures an accurate and operationally reliable centering of the turbine wheel. Because the turbine wheel is integral with the turbine blades and narrow in the axial direction, the thermodynamically required circumferential speeds are controlled by the rotor dynamics.

Such advantages will not be obtained by manufacturing the turbine wheel and the shaft integrally in a conventional manner and then attaching the turbine blades, or when the turbine wheel is provided with a central bore which receives a correspondingly sized shaft. Because of the proposed planar toothed surface, it is possible in a very simple manner to combine any one shaft with a particular required turbine wheel, and vice-versa. In practice, Hirth type serrations are particularly appropriate because they ensure an accurate and operationally reliable centering of the turbine wheel on the particular shaft with a low production cost. Because the turbine wheel and the turbine blades are integral, special fastening means such as receiving grooves or the like are not necessary for the turbine blades. The turbine wheel so designed permits reliable control even of high circumferential speeds in order to maintain the maximum efficiency of the radial-flow turbine in practice. The radial-flow turbine proposed by the invention, because of its surprisingly simple construction, allows optimal economic application with respect to capital and energy costs.

In one embodiment, the blades are mounted across an approximately triangular area to the turbine wheel which is designed as a narrow disk with a lesser axial length radially inward toward the axis of rotation than the approximately triangular area. In this embodiment of the invention, the bending stresses caused by centrifugal forces are absorbed in an especially reliable manner by the turbine wheel which is of low mass. The turbine wheel is optimized in regard to strength requirements and lost mass, whereby the high circumferential speeds required to achieve the maximum efficiency can be reliably controlled in practice.

In order to prevent damage to the radial-flow turbine from impurity particles entrained in the flow medium, one embodiment of the invention controls the path of motion of the impurity particles by means of reflection so that these particles leave the region of the turbine blades and/or the nozzle ring.

The radial-flow turbine of the invention is simple and economical in design and is highly insensitive to impurity particles. The invention is based on the insight that the entering impurity particles travel at lower speeds than the turbine wheel circumferential speed and are constantly bounced back and forth between the nozzle ring and the turbine blade. Each impurity particle is reflected many times between the turbine blade and the nozzle ring and is steadily destroyed until it is small enough to flow the flow medium. Furthermore, the relatively large mass of an impurity particle must be taken into account, and the resultant high probability of damage by frequent particle reflection is confirmed by practical results. Due to the invention's control of the path of motion of the impurity particles, they are deflected in a surprisingly rapid and simple manner out of the area of the turbine blades and nozzle ring. Thus, in the invention the impurity particles are not flung innumerable times to and fro between the turbine blades and the nozzle ring, rather they depart in the shortest time from this highly jeopardized area. In practice, different designs are used depending on the boundary conditions present in each application. However, the designs all share the common goal of affecting the path of motion of the impurity particles, and by taking into account their bouncing behavior to cause them to exit as rapidly as possible from the area of the turbine blades and nozzle ring.

In one particular embodiment, the radial-flow turbine comprises at least one trap chamber in the nozzle ring in order to collect the impurtiy particles flung back from the turbine wheel and, preferably, to evacuate them. In such a radial-flow turbine the nozzle ring is interrupted at least at one site on its circumference in order to form the trap chamber.

Appropriately this trap is hooked up to a conduit for the continuous evacuation of the impurity particles. Several such traps may be provided along the circumference, so that, in the most adverse case, the impurity particles will not have to be entrained for a full revolution. In this case, traps will be appropriately arranged symmetrically along the circumference. The traps can be formed in the turbine housing with very little construction cost.

In another embodiment, the turbine-blade ring is provided with a passageway for impurity particles at at least one site on its circumference. This passageway is in the form of either a gap in the turbine blade ring or an increased blade pitch of one or more blades. In this embodiment the turbine wheel is asymmetrical so that the impurity particles can more inwardly in the radial direction and hence will not be deflected outward at this location. The path of motion of the impurity particles is essentially radially inward.

In another preferred embodiment, the exhaust surface of at least one nozzle of the nozzle ring is mounted at a slant to the axis of rotation of the radial-flow turbine. Due to this slant, the impurity particles receive a component of axial force, whereby they are deflected very rapidly from the annular gap between the nozzle ring and the turbine blades in the axial direction. It will be understood that all the exhaust surfaces should be designed in the same manner, in particular to simplify manufacture. It should also be noted here that the scope of the invention covers all shapes of exhaust surfaces which are not cylindrical and which are coaxial with the axis of rotation of the turbine wheel.

In a further embodiment, at least one intake surface of one turbine blade of the turbine wheel is mounted at a slant to the axis of rotation. Again, the considerations stated above with respect toe the slanted exhaust surfaces apply in this case. It is also essential that by means of the slant of at least one intake surface, the impurity particles be diverted from the annular gap between the nozzle ring and the turbine blades in the axial direction.

In another embodiment of the invention, the radial-flow turbine is provided with an annular space preferably in the axial direction and located next to the nozzle ring and turbine blade ring in the turbine housing, a small part of the flow medium passing through this annular gap at a leakage rate. Preferably a gap seal is provided between the nozzle ring and the turbine blade ringing order to minimize the leakage rate. The flow medium is decelerated in this annular space, and as regards radial-flow turbines known to date, this flow medium is therefafter introduced again into the flow path proper, where is undergoes renewed acceleration; this is especially the case for two-stage and multi-stage radial-flow turbines. It has been found that a more than trivial energy consumption is required for this reintroduction of fluid and that, moreover, the turbine efficiency is reduced thereby. To avoid these difficulties, the invention proposes that a compensation orifice open into the annular space or the like, where the orifice appropriately communicates with the exhaust conduit of the radial-flow turbine. That part of the flow medium arriving in the annular space, even if only at a low leakage rate, therefore need not be re-accelerated, rather it will be evacuated through the proposed compensation orifice. Thereby a significant improvement in the overall efficiency of the radial-flow turbine will be achieved.

In order to achieve an especially simple and economical design, the turbine wheel is directly connected to the shaft of a gear unit and is supported in a common bearing for the gear housing. The radial-flow turbine and the subsequent gear unit are integrated in an especially simple manner, whereby a special bearing for the turbine wheel only is unnecessary. Furthermore, the radial-flow turbine can be combined with gear-units of different designs in order to achieve the desired math in angular speeds.

Appropriately the radial-flow turbine is designed in such a manner that the pressure behind the nozzles of the nozzle ring is reduced by the reaction from the blades only to such as extent that this pressure produces a force component in a space between the turbine wheel and the housing. This force component acts on the turbine wheel to produce an axial thrust which compensates for the opposite axial thrust produced by the turbine blades at least approximately around the design point. The turbine blading therefore is designed to have a degree of reaction and the pressure behind the intake nozzles therefore exceeds the pressure of the exhaust steam in the exhaust duct. In practice it was found to be especially appropriate to convert about 90% of the energy in the nozzles and up to 10% in the turbine wheel.

In another embodiment, bearing damper elements are provided for the bearings of the shaft which may be ball bearings. The design angular speed of the turbine is appropriately higher than the first critical angular speed in this case. Because of the external bearing damping so achieved, super-critical turbine operation is made possible with high operational reliability. The damper elements reliably reduce the oscillatory amplitudes of the turbine and shaft when passing through the critical angular speed, and high operational reliability is assured.

In another embodiment, a deviating duct is provided behind the crown of turbine blades as seen in the direction of flow between the housing and the turbine wheel. This deviating duct is so designed, i.e., it can be used in such a manner, that a diffusor is created behind the ring of turbine blades or else, if guide vanes are mounted to the housing and there is another ring of turbine blades at the turbine wheel, a radial-flow turbine of at least two rings will be so created. In this especially simple manner, the radial-flow turbines are standardized and furthermore an economical modular manufacture is achieved. In the former case the correspondingly optimized deviating duct represents the diffusor behind the turbine stage. In the latter case, guide vanes on one hand are mounted within the deviating duct, and on the other hand a further ring of turbine blades is arranged, whereby at least at two ring radial-flow turbine has been created. It is clear that this design requires that only a few special radial-flow turbine parts be attached, namely, on one hand an approximately annular turbine housing part and, on the other hand, only the turbine wheel, while the remaining parts can be kept as they are.

In another embodiment, a single central profiled tension bolt couples the turbine wheel and the drive shaft. A stepped labyrinth is provided on the drive shaft to help prevent steam from entering the gear housing. Splash rings and a second stepped labyrinth are disposed adjacent to the gear housing to prevent oil from leaking into the turbine wheel.

As regards an embodiment of the radial-flow turbine wherein the turbine blades are located on an axial end surface of the turbine wheel, a counterweight is mounted on the second end surface and preferably is designed as a peripherally subdivided ring. The turbine wheel blades mounted on one side of the end surface cause relatively high flexural and/or compressive stresses in the turbine wheel, especially for high angular speeds. The counterweight is mounted on the other end surface of the turbine wheel to compensate for these stresses. According to the present invention, the annular counterweight can be subdivided by providing it with slits in the axial direction or it can be formed as a single unit. Subdivision helps to avoid a unilateral stiffening of the turbine wheel in an especially simple manner. The individual turbine blades and, furthermore, the counterweight subdivided into segments, result in centrifugal forces which at least approximately cancel each other out, whereby inadmissible bending moments and hence additional stresses on the turbine wheel are avoided.

BRIEF DESCRIPTION OF THE DRAWINGS

Further advantages and objects of the invention are discussed below in relation to the illustrative embodiments shown in the drawings, wherein.

DETAILED DESCRIPTION OF THE PREFERRED EMBODIMENTS

Figure 1:
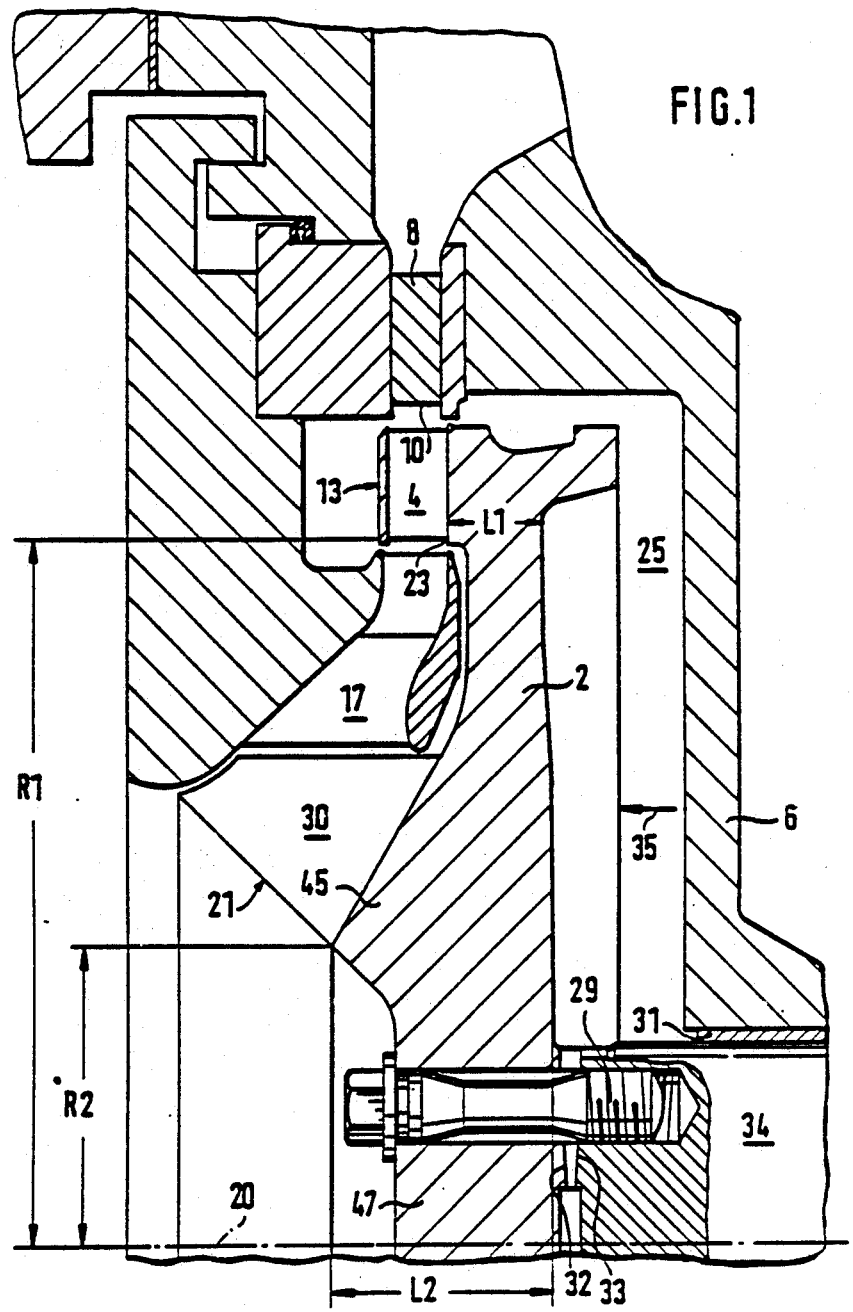
FIG. 1 is an axial, longitudinal cross-section through a radial-flow turbine of which the turbine wheel is linked by a toothed surface with the shaft.

FIG. 1 shows a longitudinal section through a radial-flow turbine, in the area of a turbine wheel 2. A turbine housing 6 receives the turbine wheel 2 in a known manner and contains a nozzle ring 8 having a plurality of intake nozzles 10 distributed around its circumference. The turbine wheel rotates about a longitudinal axis 20 and contains a plurality of external turbine blades 4 which extend radially outward in a first ring 13 of turbine blades. The medium flows continuously and in a known manner through a plurality of guide vanes 17 connected to the turbine housing 6 and then arrives at second, internal turbine blades 30 of a second ring 21 of turbine blades. Accordingly, there is provided a two-stage radial-flow turbine wherein the medium, upon leaving the second turbine blade ring 21, flows off approximately in the axial direction in a known manner by means of a diffusor.

The turbine wheel 2 is integral with the turbine blades 4, 30 and consists of a high-strength, alloyed steel. The turbine wheel 2 is made by precision casting. The turbine wheel has a radium R1 in the radially inside area of the blade base 23, the axial length being L1. The ratio of L1 to R1 is less than 0.15 in the invention and remains substantially constant radially inward as far as approximately the internal turbine blades 30. The cross-sectional area in this region is approximately rectangular. The overall turbine wheel 2 is a narrow disk, shorter in the direction of the longitudinal axis 20, whereby a low turbine wheel mass is assured. Surprisingly, it was found that the inertial forces generated at high angular speeds of the turbine wheel 2 are reliably absorbed. Because of the integral design of the turbine wheel and turbine blades, the otherwise correspondingly heavy seating means for the blade bases are not required in the invention. The turbine blades 30 are connected by an approximately triangular area 45 with the turbine wheel 2. The bending stresses caused by centrifugal forces are reliably absorbed by this area. In the region of the tip of the triangular area 45, i.e., at the radially inwardly located blade base of the turbine blade 30, the axial length of the turbine wheel 2 is L2. This axial length L2 is made relatively small in the invention, the ratio to the radium R2 at that location being less than 0.8. An approximately rectangular area 47 continues from the triangular area 45 and has an axial length less than L2. In this way, too, the mass of the turbine wheel 2 is substantially reduced. The turbine wheel 2 of the invention is designed to be a disk narrow in the axial direction and which is integral with the turbine blades 4, 30. Accordingly, the total mass of the turbine wheel 2 can be kept quite low, and consequently the thermodynamically required high circumferential speeds, i.e., the angular speeds, can also be reliably controlled.

The turbine wheel is coupled by means of planar toothed surfaces 32,33 to a shaft 34, a rigid connection being established by bolts 29. The turbine wheel 2 and also the shaft 34 are provided with several bores distributed along the circumference of the shaft 34 within the area 47, the bolts 29 passing through these bores. The bore in the shaft 34 is threaded. The toothed surfaces 32,33 essentially are located in radial planes and have conical teeth which accurately center the turbine wheel. Because of this connection, differently designed turbine wheels and shafts can be joined together in an especially simple way. Turbine wheels and shafts can be standardized and prefabricated depending on model series so that they can then be connected as needed. The planar toothed surfaces appropriately are Hirth type serrations which allow the turbine wheel to be centered. Hirth type serrations are radially extending teeth which are formed on a slightly conical surface to facilitate centering. The shaft 34 is part of a gear unit 90 joining the housing 6 at the right in the drawing. However, it is especially important within the scope of the invention that the turbine wheel be connected in a simple manner with the gear shaft 34. Hence the gear unit too can be standardized so that, depending on the requirement, a gear unit with the desired transmission-ratio or other performance characteristics can be connected to the turbine. Because the turbine wheel 2 is directly coupled to the shaft 34, a special bearing for the turbine wheel is not needed. Turbines and gear units accordingly are integrated into each other and the gear-bearing 91 supports both the turbine wheel 2 and the gear shaft 34. It should be noted here that in the invention the turbine wheel 2 is overhung, so that only a single shaft-seal 31, with correspondingly minor losses in steam leakage, is required.

The radial-flow turbine is designed to provide a slight reaction force in the first stage. It has been found appropriate in this respect to convert about 90% of the energy in the intake nozzles of the nozzle ring 8 and to convert up to about 10% of the energy in the turbine wheel. This applies to the range of the design point for the radial-flow turbine. Accordingly, a predetermined pressure is formed in a space 25 located between the intake nozzles 10 and the shaft-seal 31 and which furthermore is bounded on one hand by the housing 6 and on the other hand by the turbine wheel 2. This pressure acts in the direction of the arrow 35 on the turbine wheel 2 to compensate for the axial thrust.

Figure 2:
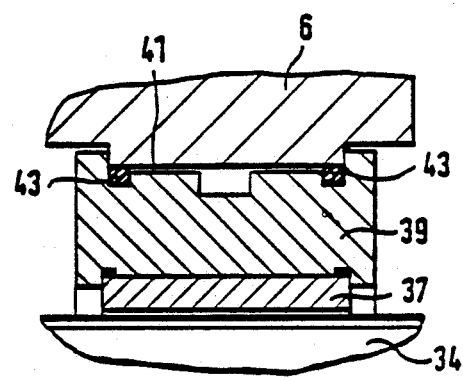
FIG. 2 is a schematic of the shaft-bearing in a housing.

FIG. 2 schematically shows a known external bearing damper for the shaft 34. FIG. 2 is a continuation of the extension of the shaft 34 of FIG. 1 at the lower right. The shaft 34 is enclosed by an annular bearing 37 which is mounted in a bearing flange 39 of the housing 6. An oil containing gap 41, sealed in this instance by O-ring seals 43, is provided between the bearing flange 39 and the housing 6. The oil containing gap 41 and seals 43 are shown here illustratively and act as an external bearing damper. However, they may be replaced by other pertinent known damper elements such as sheet-metal pack dampers or wire-pad dampers. In the invention, in combination with the proposed turbine wheel, the maximum efficiency of the radial-flow turbine is also achieved reliably at high circumferential speeds. Appropriately, the design angular-speed of the radial-flow turbine of the invention is above the first critical angular speed.

Figure 3:
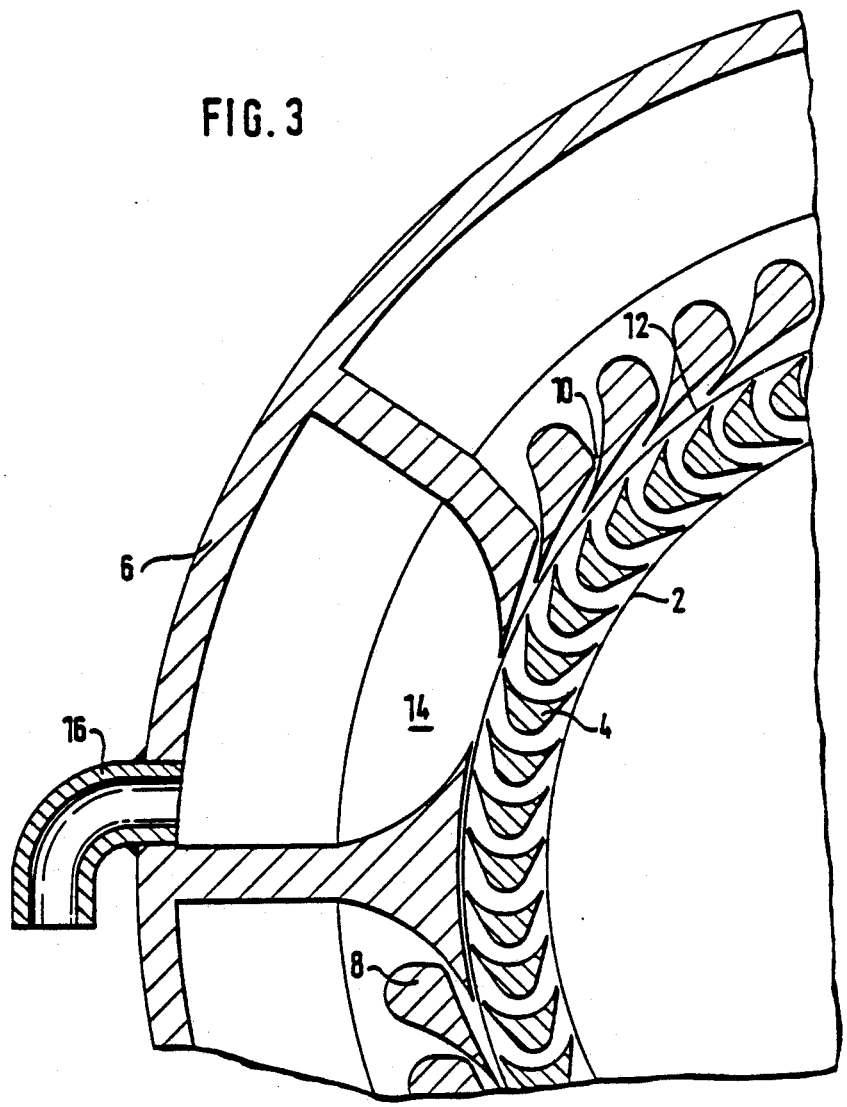
FIG. 3 is a partial schematic section transverse to the axis of rotation of a radial-flow turbine.

FIG. 3 schematically shows a turbine wheel 2 with turbine blades 4. The turbine wheel is mounted within a turbine housing 6 in a known manner. Housing 6 contains a nozzle ring 8 associated with the turbine blades 4 and comprises a plurality of nozzles 10. Impurity particles pass through the nozzles 10 together with the flow medium, in particular steam, and arrive in an annular gap 12 between the turbine blades 4 and the nozzle ring 8.

Because such impurity particles move more slowly than the circumferential speed, they inherently bounce back and forth between the turbine blades 4 and the nozzle ring until they are small enough to follow the flow medium. The susceptibility of the radial-flow turbine to soiling caused by the frequent impact of the impurity particles on the turbine blades 4 and the nozzle ring 8 is appreciably reduced by a trap chamber 14 provided by the invention in the turbine housing 6. The trap chamber 14 interrupts the path of motion of the impurity particles and thereby suppresses further reflection of the particles. It should be understood in this regard that there possibly will be several such trap-chambers 14 distributed along the circumference of the radial-flow turbine, whereby incoming impurity particles in annular gap 12 will enter a trap chamber 14 after only a few reflections. A duct 16 is connected to the trap chamber 14 and assures continuous evacuation of the impurity particles from the trap chamber 14. The trap chamber 14 is located essentially in the same radial plane as the turbine blades 4 and the nozzle ring 8.

Figure 8:
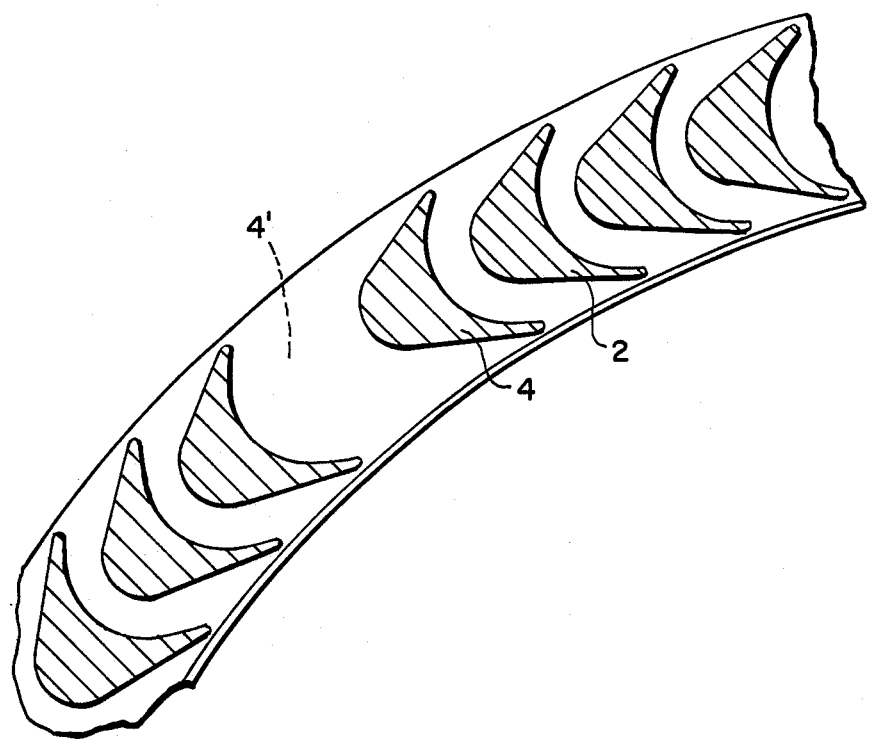
FIG. 8 is an enlargement of a group of turbine blades showing one blade missing.

In another embodiment of the radial-flow turbine of the invention, at least one, and possibly several, of the ordinarily circumferentially symmetrically mounted turbine blades 4 are absent from the turbine wheel 2. Removal of a turbine blade is indicated in phantom at 4' in FIG. 8. Accordingly, gaps are deliberately provided between the turbine blades 4. These gaps form passageways for impurity particles to move, in this case, in the inward radial direction. The same effect can also be achieved by increasing the pitch of the turbine blades 4, at least at one site on the circumference, whereby asymmetry is achieved and the impurity particles can be evacuated inwards.

It should also be noted here that the steps already discussed and those to be explained below can be combined within the scope of this invention with other known features in order to achieve optimal characteristics for particular applications and in particular high efficiency.

Figure 4:
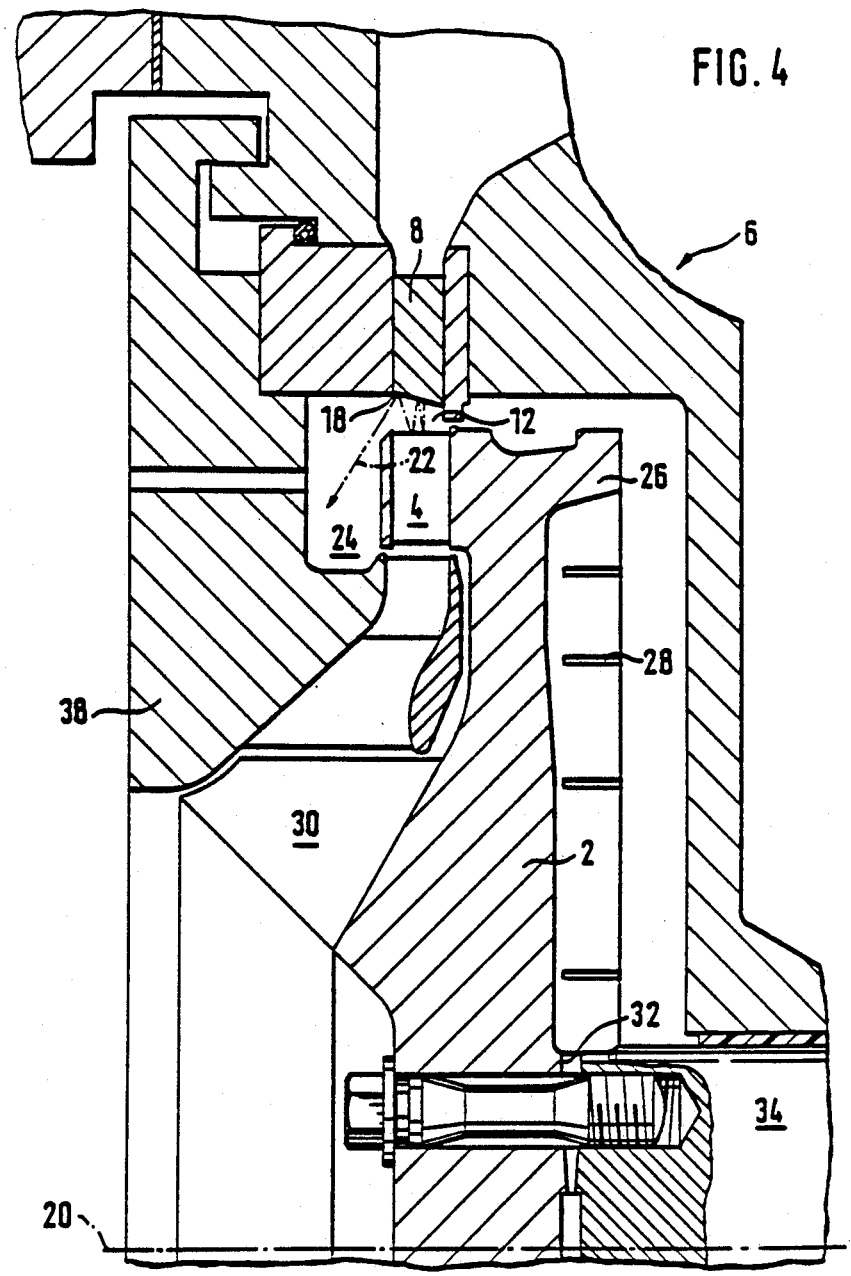
FIG. 4 is a longitudinal section through a radial-flow turbine with slanted exhaust surfaces of the nozzles of a nozzle ring.

FIG. 4 is a longitudinal section through a radial-flow turbine wherein the exhaust surfaces 18 of the nozzle ring are slanted with respect to the axis of rotation 20. As indicated by the dash-dot lines 22, an impurity particle enters an annular space 24 after only a very few reflections. The path of motion indicated by the dash-dot line 22 obviously is not in the plane of the drawing, but rather in the circumferential direction.

The turbine blades 4 are located on a first axial end surface, a counterweight 26 being provided on the opposite, second axial end surface of the turbine wheel 2. The annular counterweight 26 is subdivided into individual segments by means of axial slits 28 to suppress one-sided stiffening and any resulting addition loading of the turbine wheel 2 as much as possible. In other words, since the turbine vanes on blades 4 comprise individual segments formed integrally on one axial side of the turbine wheel, the counterweight 26 must also be individual segments to properly balance the blades and to prevent one side of the turbine wheel from being stiffer than the other. The turbine wheel 2 therefore is designed to be a comparatively narrow disk as seen in the direction of the axis of rotation 20. The turbine blades 4 and also further turbine blades 30 of a second ring of turbine blades are integral with the turbine wheel 2. Due to this integral design using a high-strength, alloyed steel, preferably formed in a precision casting, a relatively low mass of rotation is obtained. The turbine wheel 2 is connected by a planar toothed surface 32, in this instance a Hirth type serration, to a shaft 34. The turbine wheel 2 therefore is formed without any central bore for coupling to a shaft, rather it is designed as a continuous narrow disk.

Figure 5:
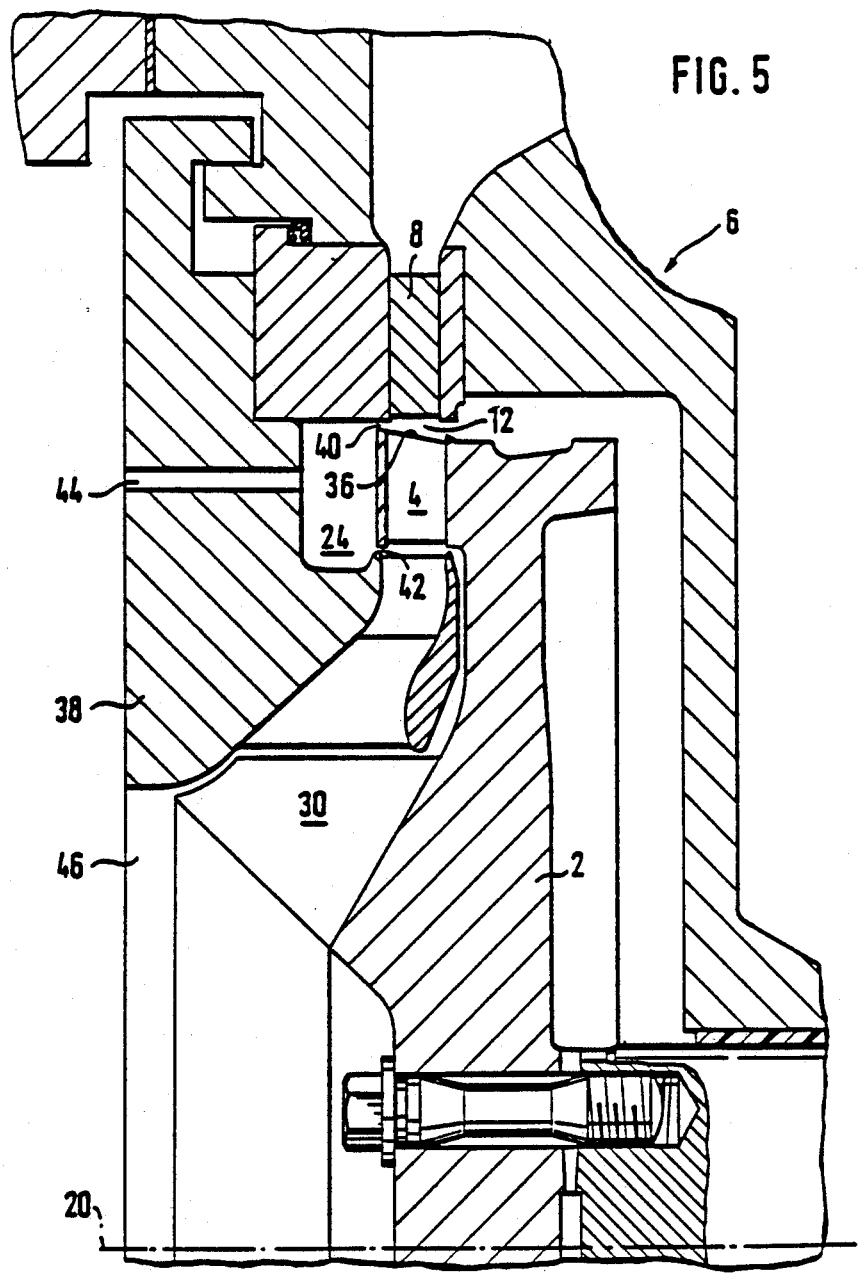
FIG. 5 is a longitudinal section through a radial-flow turbine with slanted intake surfaces of the turbine wheel blades.

The embodiment of FIG. 5 differs from the above essentially in that the intake surfaces 36 of the turbine blades 4 are slanted with respect to the axis of rotation 2, i.e., they are conical. Entering impurity particles thereby receive an axial component of force resulting in a very rapid evacuation of the impurity particles out of the annular gap 12. The turbine housing 6 in this case is provided with an approximately annular component 38 which is of such as design in the area of the turbine blades 4 that the annular space 24, discussed above, is created thereby. A more than trivial, through small, portion of the flow medium passes through seal gap 40 into this annular space 24, at a rate of leakage depending on the particular application. This portion of the flow medium next is decelerated and then is accelerated again at the entry of another seal gap 42; inherently this mechanism causes a reduction in efficiency. In order to achieve a high efficiency, at least one compensating orifice 44 opens in the annular space 24 and leads to the evacuation duct 46. The leakage portion of the flow medium flowing through the seal gap 40 therefore is evacuated and no longer needs to be accelerated.

Figure 6:
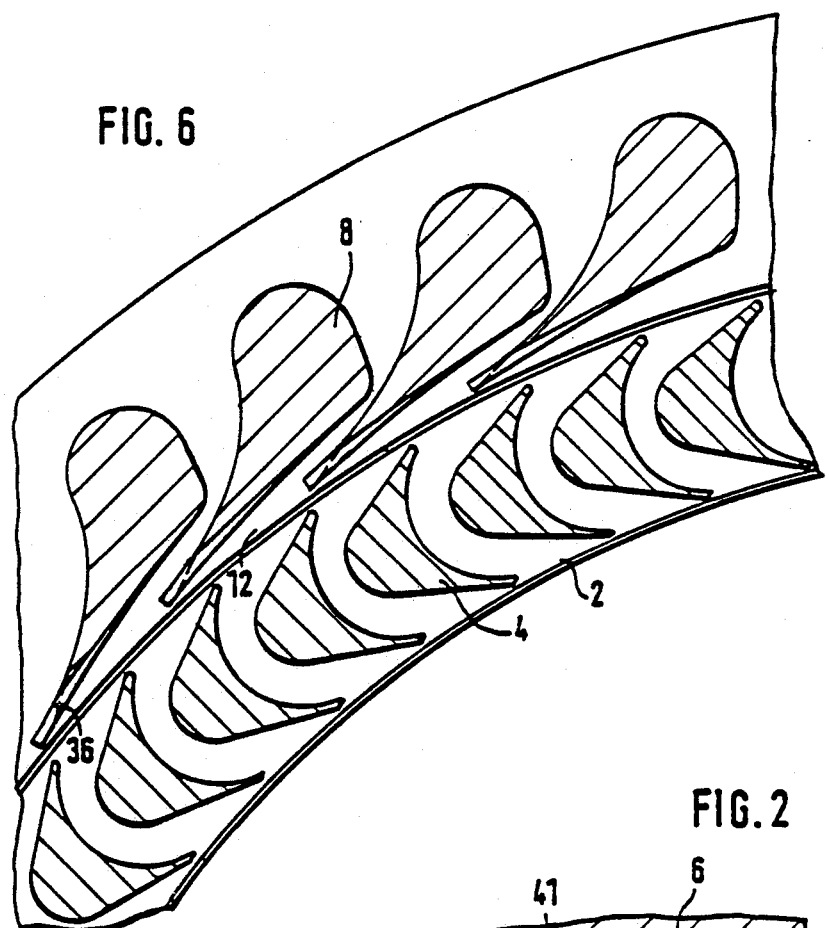
FIG. 6 is an enlargement of several nozzles with slanted exhaust surfaces.

FIG. 6 shows an enlargement of a nozzle ring 8 in which the exhaust surfaces 18 are slanted to the plane of the dawing and hence to the axis of rotation of the turbine wheel 2. Due to the slope, i.e., the slant of the exhaust surfaces, an axial force component is imparted to the impurity particles, so that rapid evacuation from the annular gap 12 is achieved.

Figure 7:
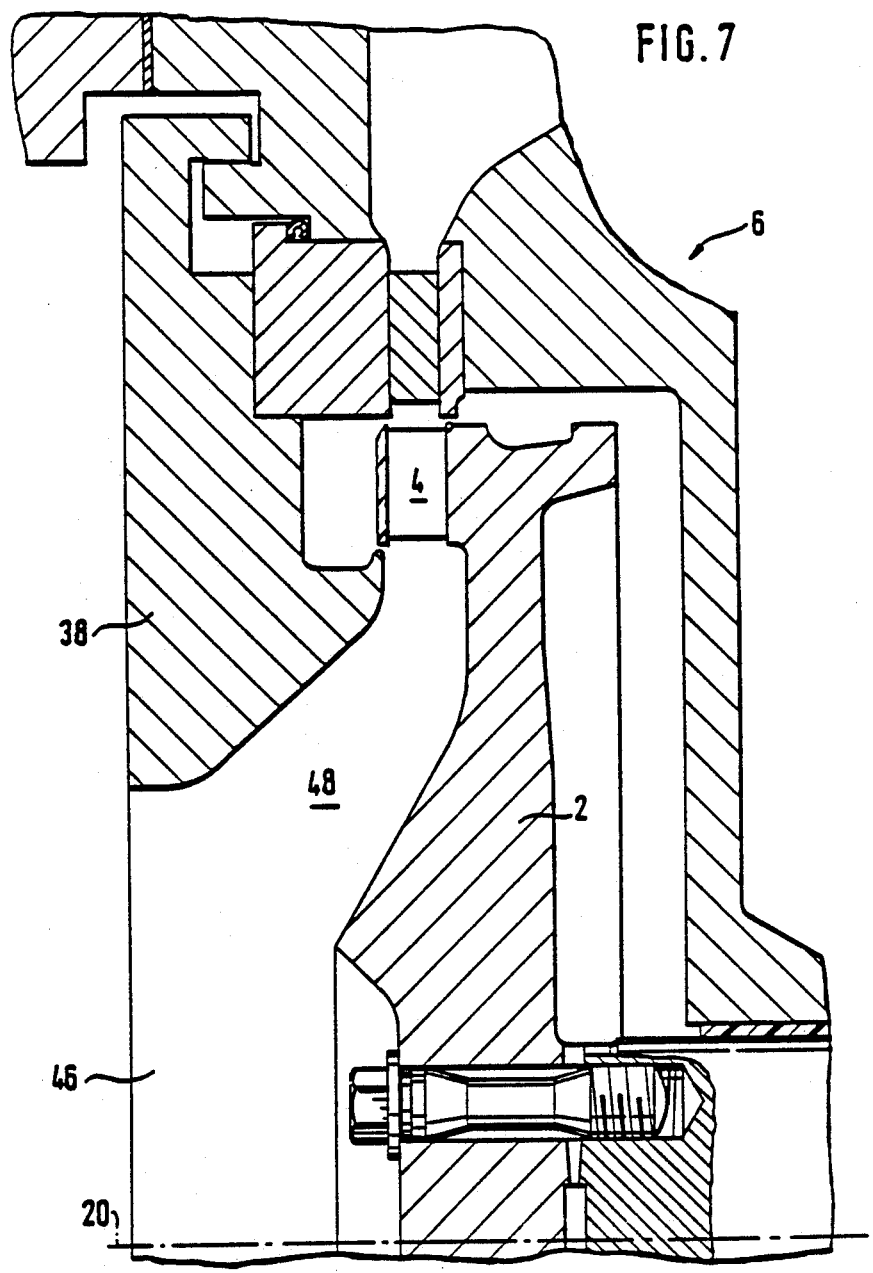
FIG. 7 is a longitudinal section through a single ring radial-flow turbine with a diffusor.

FIG. 7 shows a single ring radial-flow turbine, which is provided with a deviating duct 48 between the turbine wheel 2 and the turbine housing 6, i.e., the latter's annular component 38. This deviating duct 48 is designed as a conventionally known diffusor. Referring briefly to FIGS. 2 and 3, it can be seen that in the embodiment of FIG. 7, only the second turbine blades of the turbine wheel and the guide vanes of component 38 are absent from the turbine housing. Due to this simple omission, the two ring radial-flow turbine therefore becomes a single ring radial-flow turbine with diffusor. This is achieved at minimal cost because only the component 38 and the turbine wheel 2 have to be designed accordingly, the remaining components of the radial turbine being the same. This step is significant for the standardization of turbines.

Figure 9:
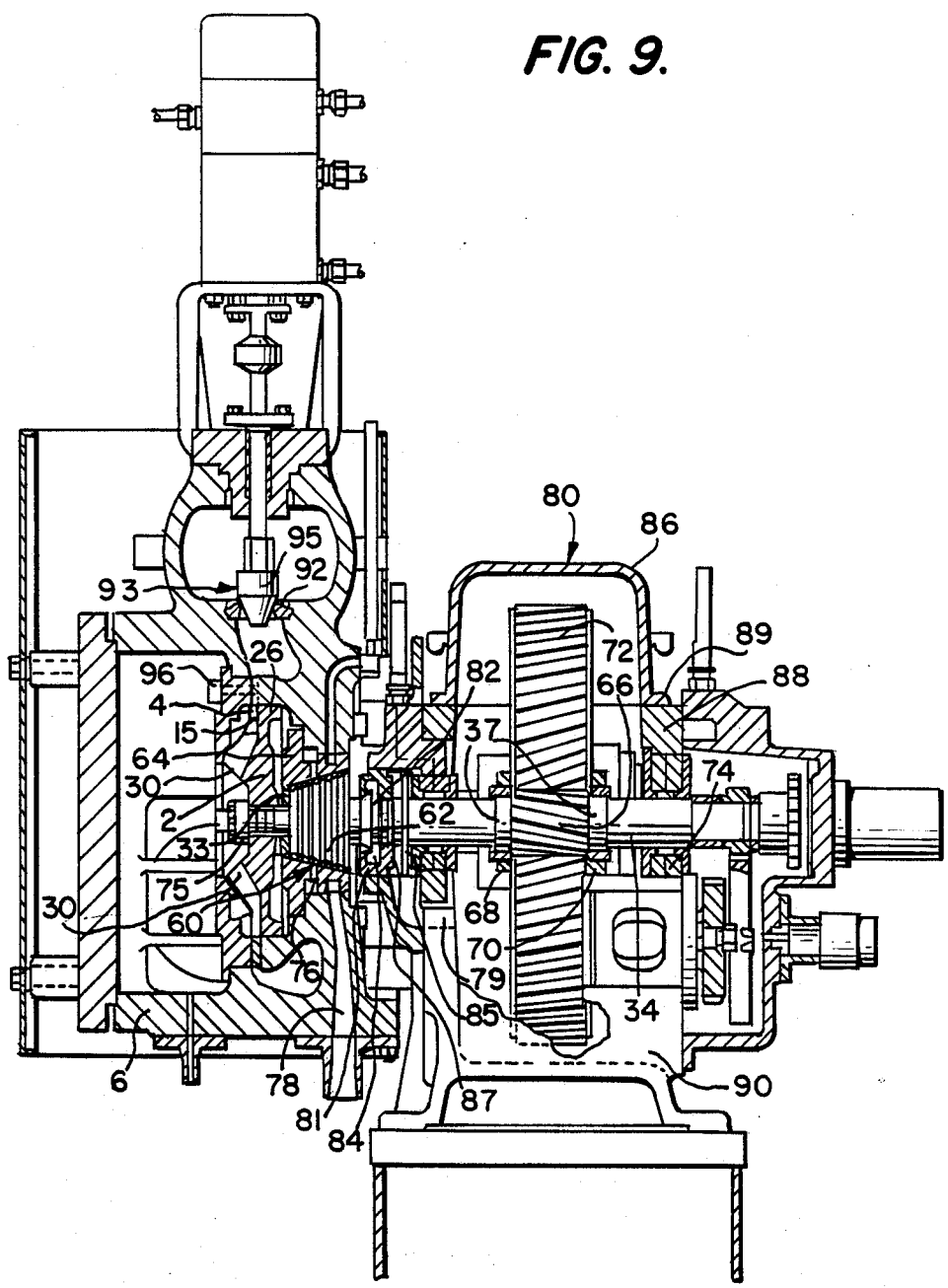
FIG. 9 is an axial longitudinal cross-section through a radial-flow turbine having a stepped labyrinth disposed at the end of the drive shaft.
Figure 10:
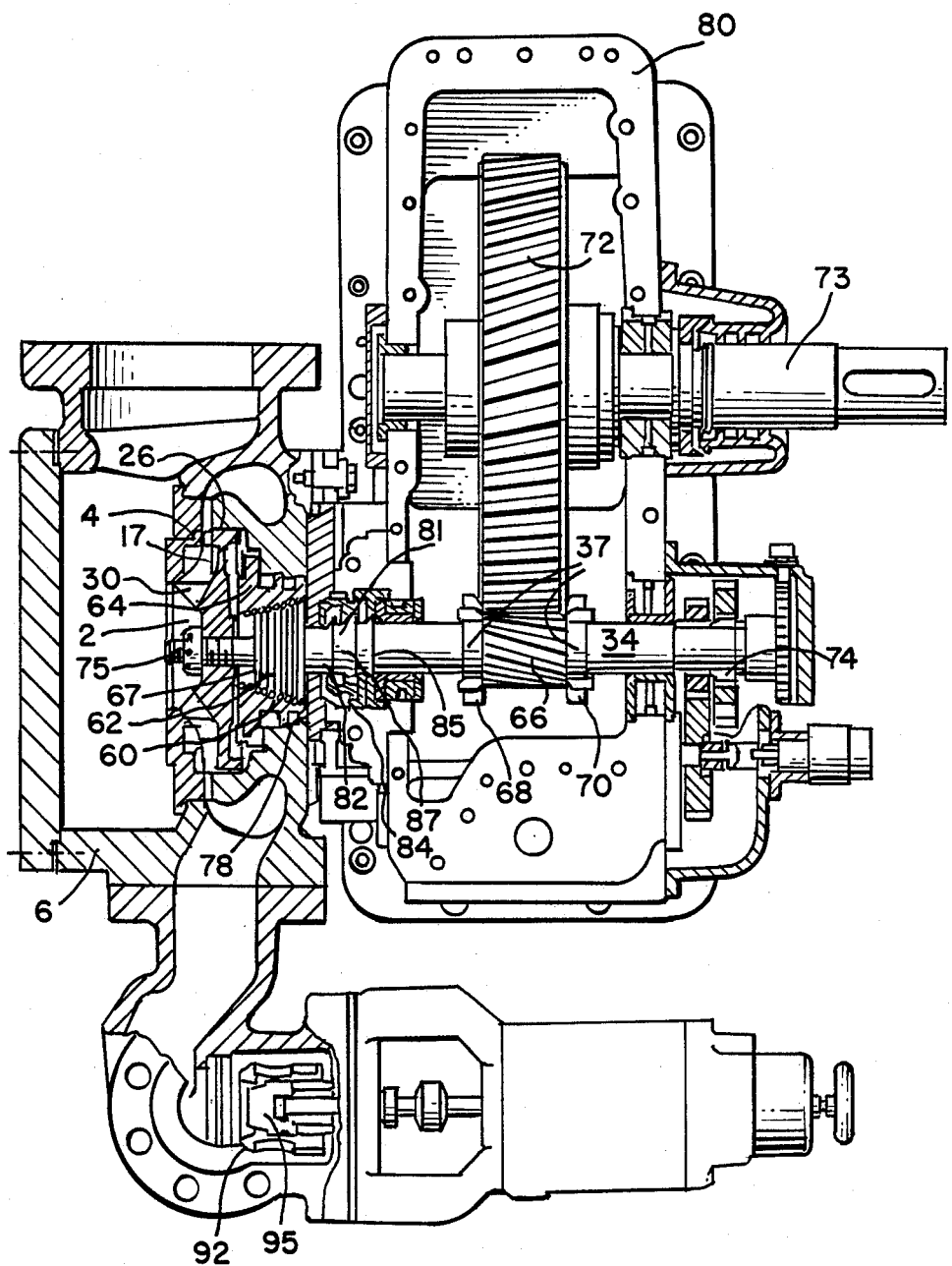
FIG. 10 is a top sectional view of the embodiment illustrated in FIG. 9.
Figure 11:
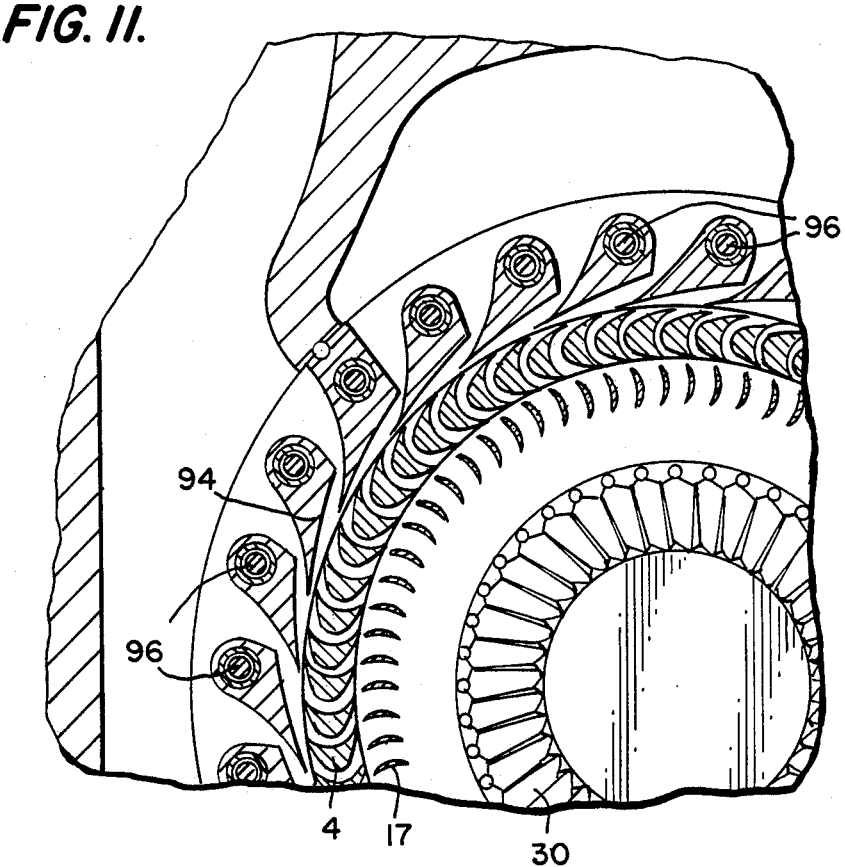
FIG. 11 is a front elevation view of a turbine wheel 2.
Figure 12:
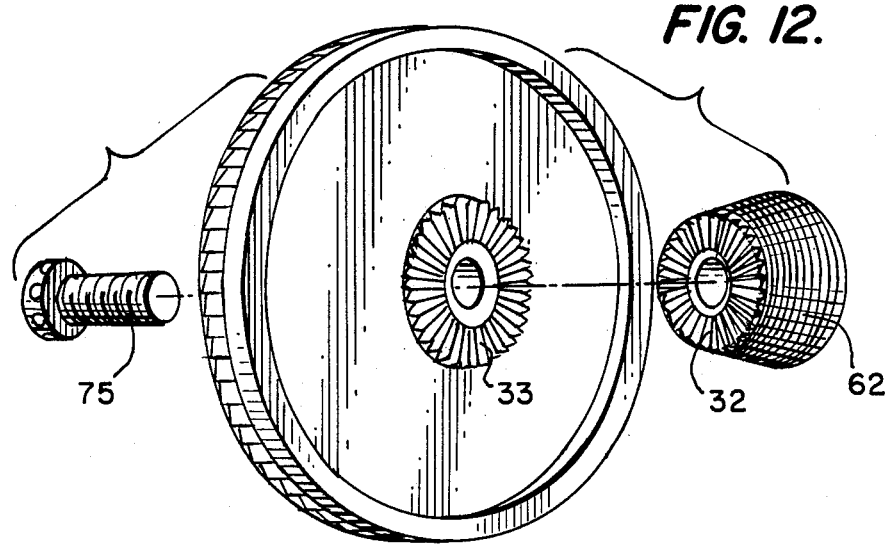
FIG. 12 shows mating surfaces of a conical terminal part of a drive shaft and of a turbine wheel.
Figure 13:
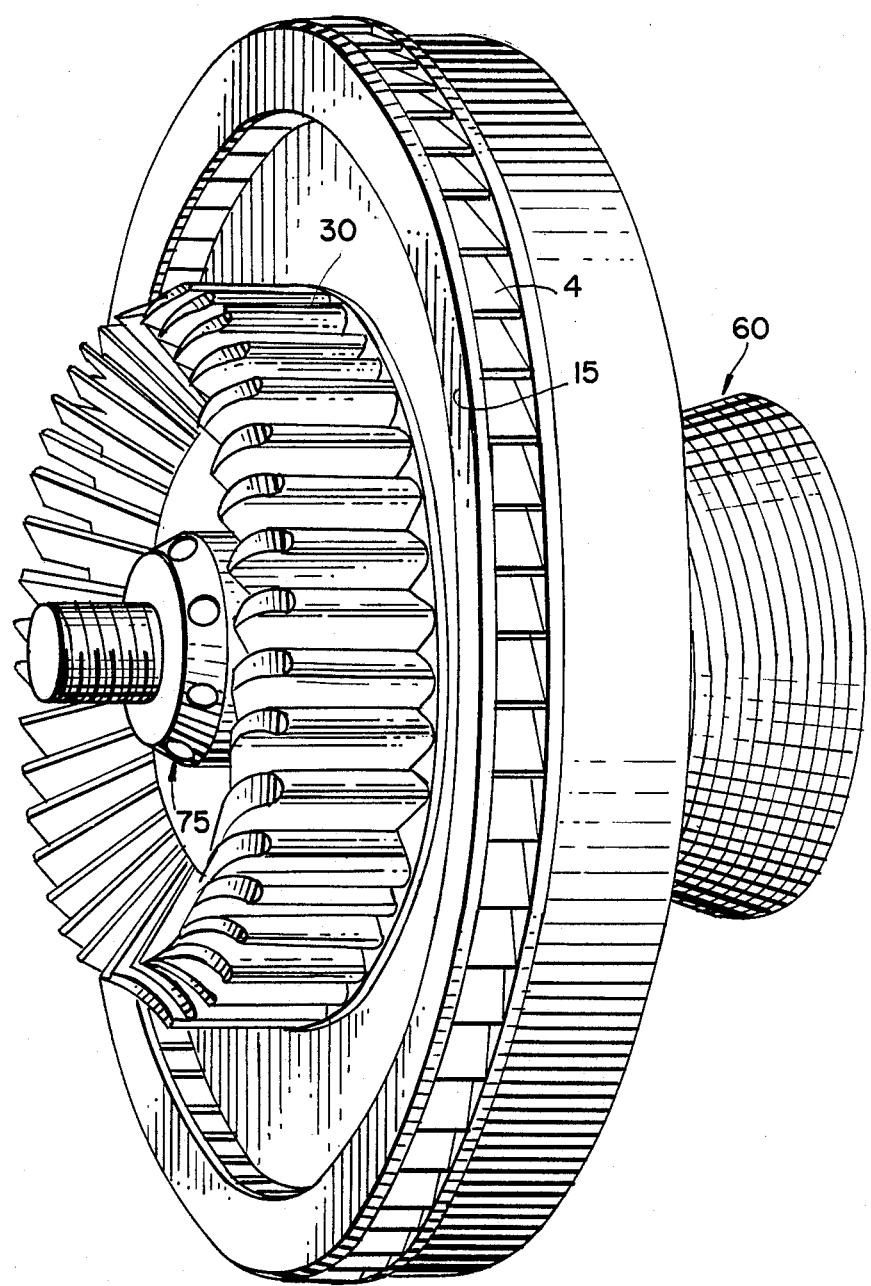
FIG. 13 shows a side elevation view of a turbine wheel connected to a drive shaft.

FIG. 9 shows a sectional side view through an alternative embodiment of a radial flow turbine. FIG. 10 shows sectional top view through the embodiment illustrated in FIG. 9. Like numerals refer to like parts in FIG. 9 and 10. The embodiments shown in FIGS. 9 and 10 are also illustrated in FIGS. 11-13.

Steam flows into the turbine through valve 93. The valve 93 is comprised of a valve seat 92 and a valve cone 95. The valve seat 92 is comprised of a hard material which is pressed and sealed into a bore at a relatively low temperature. The steam valve 93 permits regulation of the volume of steam flowing radially into the turbine. The valve cone 95 is moved back and forth so that to contact the valve seat 92. The valve housing is made of cast iron and the valve seat is made of a relatively hard steel, such as an alloy steel containing manganese, chromium, or nickel. Traditionally, valve seats are welded into bores, however, the valve seat 92 can be cold pressed in the bore due to its composition. Welded valve seats introduce such attendant problems as weld stresses, deformations, etc. However, by cold pressing the valve seat 92 into the bore, these problems are eliminated.

A turbine wheel 2 is received in a turbine housing 6. The turbine wheel 2 has first and second turbine blade rings 4 and 30. A single solid counterweight 26 counter balances the blade rings 4 and 30. A ring of guide vanes 17 is disposed between the blade rings 4 and 30. FIG. 11 shows a frontal view of the turbine wheel having the blade rings 4, 30 and also shows the guide vanes 17. The guide vanes 17 direct the flowing medium from blades 4 to blades 30. Hence, the system is a two-stage radial flow turbine.

Steam jets 94 are fastened in the turbine housing 6 via screws 96. The screws are turned in order to adjust the steam jets which define the flow angle of the steam. Thus, different layouts and settings of the steam jets can be achieved for different steam conditions. This flexibility allows the same turbine to be used for various applications. FIG. 9 shows the screws and steam jets along line A-B.

The turbine wheel 2 is formed integrally with the turbine blades 4, 30 by precision casting. The integral construction eliminates the need for seats for receiving the blade bases. Therefore, the mass of the wheel 2 can be significantly reduced and the unit can achieve peripheral velocities of up to 400 m/s. The nozzle ring 8 is formed of steam jets 94, which are also precision cast. Precision casting eliminates such problems as weld joints in the steam space, thereby providing for a more stable structure. Additionally, an annular cover band 15 is formed integrally (by precision casting) with the turbine wheel 2 and covers the outer ring of turbine blades 4. The cover band 15 reduced pressure losses in the blade area, thereby further increasing the overall efficiency of the system. Further, as the cover band 15 is formed integrally with the wheel 2, optimum layouts not possible by welding or screwing can be realized.

The turbine wheel 2 is connected to a drive shaft 34 by a single central profiled tension bolt 75. As shown in FIG. 12, the mating surfaces 32 and 33 (also termed "crown gears") of the drive shaft 34 and turbine wheel 2 are provided with Hirth couplings. The mating surfaces on which crown gears 32 and 33 are formed are slightly conical in form. The conically tapered surfaces on which the Hirth couplings are formed eliminate the need for re-balancing the turbine wheel 2 after release of the turbine wheel 2 from the shaft 34. Traditionally, such delicate balancing has been effected during manufacture, and separation of the turbine wheel 2 and shaft 34 subsequent to manufacture has required a cumbersome balancing operation. However, the conically tapered Hirth couplings of crown gears 32 and 33 insure accurate and reliable self-centering of the turbine wheel 2 with the drive shaft 34.

The central profiled tension bolt 75 extends through the turbine wheel 2 and drive shaft 34. By removing the central profiled tension bolt 75, the turbine is easily disassembled and re-asembled. Thus, various modular components can be easily replaced, rendering the system compatible with different driven machines and/or output requirements.

The drive shaft 34 is formed with thrust collars 37 on each side of a helical pinion gear 66. Pressure cogs 68 and 70 are provided on the sides of the pinion 66 of the drive shaft 34 over the thrust collars 37. The pressure cogs may tkae the form of thrust bearings or the like. The pinion gear 66 gearing is bearingly supported in the axial direction by cogs 68 and 70 on the tooth gear 72. This construction eliminates the need for special axial bearings for the drive shaft 34. Accordingly, the overall efficiency of the system is enhanced, because the attendant losses associated with the axial bearings are eliminated. Alternatively, radial bearings 74 can be integrated with an axial bearing. The helical pinion gear 66 drives helical gear 72 which is coupled to output shaft 73. The parallel shaft helical gearbox with the thrust collars 37 reduced the turbine speed to that of a driven machine which is connected to output shaft 73. Also, the integral gearbox is more compact than the conventional separate gearbox arrangement. Further, the gear structure of the present embodiment eliminates two high speed shaft bearings and a high speed shaft coupling, as would be necessary with a conventional turbine gearing system.

The turbine housing 67 is releasably connected to the gear housing 80. The turbine wheel 2 is coupled to the drive shaft 34 via crown gears 32 and 33, and all bearings for the pinion shaft are contained in the gear housing. This construction further facilitates substitution of modular components and disassembly of the turbine for inspection purposes, etc.

The gear housing includes an upper part 86, an intermediate part 88, and a lower part 90. The upper part 86 and intermediate part 88 are joined at junction 89. The inermediate part 88 and the lower part 90 are joined at a junction (not shown) which passes through a plane perpendicular to the plane of the drawing and through drive shaft 34. If the drive gear needs to be disassembled, only upper part 86 and intermediate part 88 must be removed. These parts are relatively small and are easily removed at the site of the turbine without large tools.

The drive shaft 34 has a conical terminal part 62 disposed at the end of the shaft having crown gear 33. A stepped labyrinth 67 is disposed on the conical terminal part 62 of the drive shaft. This construction yields a short length of shaft, which improves performance and reduces manufacturing costs. A stepped labyrinth seal 60 is provided at the end of the drive shaft 34. The stepped labyrinth seal 60 provides a steam tight seal in order to prevent steam leakage into the gear housing. Accordingly, such problems as gear corrosion, etc., are avoided.

The conical terminal part 62 is surrounded by a labyrinth sealing body 64 which is set into the turbine housing 6. The sealing body 64 has channels 76 is the form of grooves or bores. The provision of channels 76 permits leaking steam to flow out through the channels 78 away from the gearing. In this manner, a high operating safety is achieved.

Further, oil from the gearing is not permitted to leak into the turbine wheel. A splash ring 82 is provided on the turbine side of the drive shaft 34. Adjacent to the spash ring 82 is an oil capture chamber 84. Also provided on the drive shaft are a second stepped labyrinth 87 and a second splash ring 85. The oil capture chamber 84 is found in the gear housing. Oil which escapes from the gearing housing along shaft 34 is caught by a first splash ring 85. Additional oil not caught by the splash ring 85 contacts a stepped labyrinth 87. Oil not caught the stepped labyrinth 87 comes into contact with splash ring 82 and is guided into the oil capture chamber 84. Also, a narrow gap 81 is positioned bewteen splash ring 82 and stepped labyrinth 87. If oil or another lubricant penetrates gap 81, the oil is returned to the gear housing via a gutter 79.

The overall combination of novel and efficient features contained in the embodiment of FIG. 9 yields a highly efficient turbine. The optimum wheel efficiency of the embodiment of FIG. 9 is close to 80%. The novel gear structure, pressure loss reducing cover band 15, and flexible structural charcteristics render the embodiment compatible in a modular system environment and approach the efficiency of a multi-stage turbine.

The foregoing descriptions have been set forth for the purpose of illustrating the present invention but are not deemed to limit the scope thereof in any way. Clearly, numerous additions and other modifications can be made to the invention without departing from the scope of the invention as defined in the appended claims.

What is claimed is:

1. A radial flow steam turbine comprising:
   an overhung turbine wheel acted upon by steam flowing radially inward of said turbine wheel, said turbine wheel including disk formed so as to be narrow in the axial direction;
   a radially extending, toothed connection surface on the rear of said disk;
   at least one ring of turbine blades formed integrally with said disk, said ring formed on a thickened part of said disk, said part being essentially triangularly shaped in axial cross-section, said thickened part having an axially greater dimension than the part containing said toothed connection surface;
   a drive shaft having a frusto-conical terminal part, said frusto-conical terminal part having a self-centering, toothed axially facing connection surface such that said drive shaft mates with the toothed surface of said turbine wheel;
   screw means for fixedly attaching said turbine wheel to said drive shaft;
   a first stepped labyrinth on said frusto-conical terminal part;
   a labyrinth sealing body surrounding said first stepped labyrinth; and
   means for actuating said drive shaft including a first pinion concentrically located on said drive shaft, a second pinion for actuating said first pinion, and means for avoiding slippage of said first pinion in an axial direction.

2. The steam turbine of claim 1, in which said disk contains peripherally arranged rotor blades, and counterweights therefor positioned on said disk at locations corresponding to the angular positions of said blades.

3. The turbine of claim 1, further including a turbine housing, said housing accommodating said turbine wheel, the frusto-conical part of said drive shaft, said first stepped labyrinth and said labyrinth sealing body, said labyrinth sealing body including means for removing steam therefrom.

4. The turbine of claim 1, further, including a first splash ring located around said drive shaft adjacent to said frusto-conical portion thereof.

5. The turbine of claim 4, further including a second stepped labyrinth adjacent said first splash ring.

6. The turbine of claim 5, further including a pair of splash rings provided around said drive shaft in association with said first and second stepped labyrinths.

7. The turbine of claim 6, further including a narrow gap between said splash ring and said associated frusto-conical part, and a a gutter adjacent said gap for guiding oil therefrom.

8. The turbine of claim 1, further including an oil capture chamber.

9. The turbine of claim 1, futher including a steam valve for regulating the amount of steam flowing into the turbine.

10. The turbine of claim 9, in which the seat of said valve is made of alloy steel.

11. The turbine of claim 10, in which said alloy steel is a material selected from the group of manganese steel, chromium steel and nickel steel.

12. The turbine of claim 1, in which a single bolt extends through said first and second connection surfaces to connect said turbine wheel and said drive shaft.

13. The turbine of claim 1, in which said first and second connection surfaces are conically tapered.

14. The turbine of claim 1, further including an annular cover band integral with said turbine wheel for reducing pressure losses at the region of said turbine blades.

* * * * *